Sept. 2, 1952 — A. M. MOEN — 2,609,205
FAUCET
Filed April 13, 1945
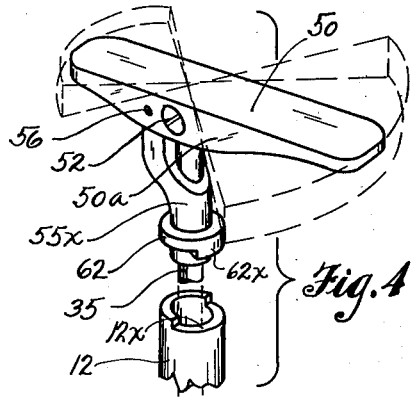
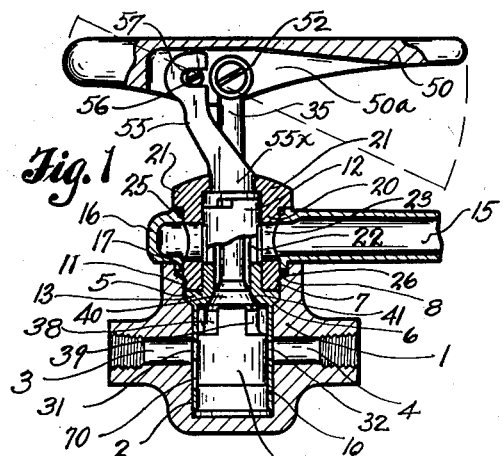
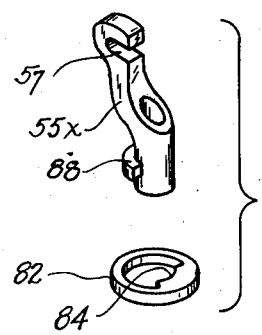
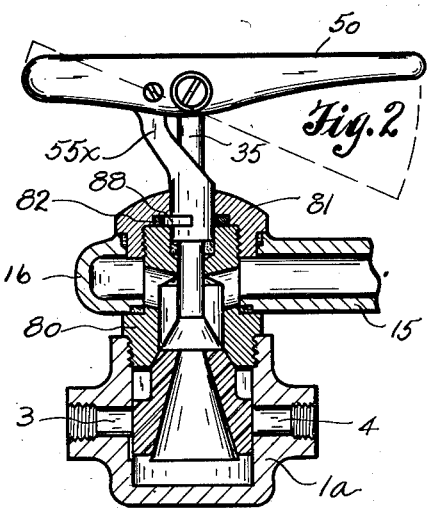
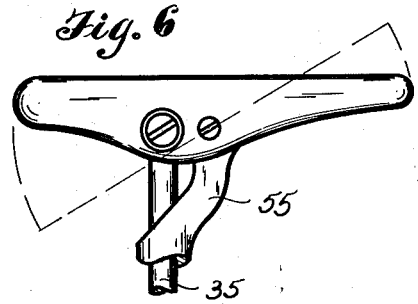
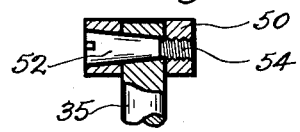
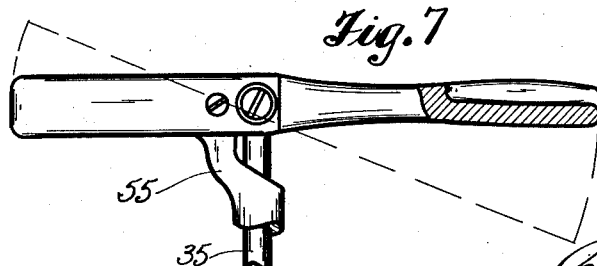
INVENTOR.
ALFRED M. MOEN
BY
Cook & Robinson
ATTORNEYS Patented Sept. 2, 1952

2,609,205

UNITED STATES PATENT OFFICE 2,609,205

FAUCET

Alfred M. Moen, Seattle, Wash., assignor of one-tenth to Robert O. Boyker, Seattle, Wash.

Application April 13, 1945, Serial No. 588,091

1 Claim. (Cl. 277—11)

This invention relates to improvements in faucets, and has reference more particularly to improvements in control lever mechanisms for use in connection with faucets of that type disclosed in my copending application filed August 14, 1943, under Serial No. 498,625; now Patent No. 2,373,702 dated April 17, 1945 that being a continuation in part of an earlier application filed August 4, 1941, under Serial No. 405,349 now abandoned.

More specifically stated, this invention has to do with an improved control lever mechanism for the operation of faucets of those types wherein a single piston valve is rotatably adjustable for the mixing of hot and cold water in various proportionate amounts and movable endwise for shutting off and for controlling the amount of flow through the faucet.

It is the principal object of this invention to provide a control lever mechanism that may be easily and readily assembled with the faucet; that is a practical and satisfactory means for moving the faucet in its intended manner, and through which a desired balance may be obtained thereby to cause the valve to maintain a set open position.

Other objects of the invention reside in the details of construction of the various parts, in their combination and relationship and in their mode of use, as will hereinafter be fully described.

In accomplishing these and other objects of the invention, I have provided the improved details of construction, the preferred forms of which are illustrated in the accompanying drawings, wherein—

Fig. 1 is a cross sectional view, taken along the axial line of a faucet that is equipped with a control lever mechanism embodied by the present invention.

Fig. 2 is a similar view showing a side view of the lever, and showing it in connection with a faucet of an alternative form.

Fig. 3 is a cross sectional detail of the hand lever, at its pivotal point of connection with the piston valve stem.

Fig. 4 is a perspective view, showing details of the lever mounting bracket and a part of the stem on which the bracket is rotatably adjustable with the turning of the lever from side to side.

Fig. 5 is a perspective view showing details of a bracket and limiting ring as used in the faucet of Fig. 2.

Fig. 6 is a side view of an alternative form of lever.

Fig. 7 is a side view partly in longitudinal section of still another form of lever.

Referring more in detail to the drawings—

First describing the faucet shown in Fig. 1: 1 designates the faucet body or housing. This is formed with a vertical cylindrical bore 2 into which, at opposite sides, ports 3 and 4 enter. These ports, at their outer ends, are threaded for connection with pipes, not herein shown, through which, respectively, hot and cold water is supplied under pressure to the faucet. At its upper end, the cylindrical bore 2 opens into a counterbore 5 which joins with the bore 2 in an annular, conically tapered seat 6. Above this seat, the counterbore is threaded, as at 7, and above this threaded part is another annular, upwardly facing seat 8.

Fitted in the bore 2, which extends to near the bottom of the body, is a sleeve 10, closed at its upper end by a horizontal wall 11 from which a tubular stem 12 extends. The stem is coaxial of the sleeve 10 and opens thereinto. The wall 11 extends slightly beyond the sleeve and forms an annular, projecting shoulder 13 that seats tightly against the annular seat 6. Fitted to the upper end of the body 1 is a spout 15 having a hollow head portion 16 open to the spout channel, and formed on its under side with a circular, downwardly projecting flange 17 that fits in the upper end of the counterbore just above the seat 8.

The spout head is formed with a vertical passage, and extended therethrough is a hollow nut 20, the lower end of which is threaded into the threaded part 7 of the counterbore of the valve body. On the outer end of the nut is an annular, projecting shoulder 21 that engages against the spout head to hold the spout in place on the body 1, but permitting rotatable swinging of the spout about the tubular nut. Formed in the stem are openings 22 registered with openings 23 in the nut wall and these latter open into the spout head, thus providing for outflow of water from the stem into the spout when the valve is open, as presently will be understood.

Packing of suitable kind is disposed between the spout head and the shoulder 8, as at 26, and also between the spout head and nut shoulder 21, as indicated at 25.

Rotatably fitted in the sleeve 10 is the valve piston 30, which overlies ports 31 and 32 in the sleeve walls that open to the ports 3 and 4 respectively. At its upper end, the piston 30 has a shaft or stem 35 extending upwardly, through the tubular stem 12 and through and beyond the nut 20. Through the mediacy of the stem 35, the piston valve may be rotatably adjusted and also moved up and down in the sleeve.

In the upper, opposite side portions of the piston valve are passages 38 and 39 that open to the upper end of the piston, and located about the base of the stem 35, and seated against the piston end, is a conical valve member 40 adapted, when the piston valve is in fully raised position, to close against a valve seat 41 formed in the wall 11 to stop outflow of water from the faucet through the tubular stem 12. When the piston is moved downwardly, to unseat the valve, the channels or passages 38 and 39 may be registered with the ports 31 and 32 for an outflow of hot and cold water mixture, and then by rotatable adjustment of the piston, the proportionate amounts of hot and cold water may be varied as desired, as is explained fully in the copending application before referred to; this being due to the relationship of ports and channels in the ports.

For the purpose of controlling the operative movements of the piston valve, I have provided the hand lever mechanism shown best in Figs. 1 and Fig. 4, and which is the basis of this application. In these views, 50 designates the hand lever, normally disposed in a horizontal position, and pivotally attached to the upper end of the stem 35 at about a medial point between the ends of the lever. For this connection the lever may be formed with a hole vertically therethrough as in Fig. 3, or with spaced opposite side flanges 50a between which the upper end of stem 35 is located.

The means for effecting the pivotal connection of the lever 50 and stem 35 comprises a pivot screw 52 that extends horizontally through the upper end of stem 35 and likewise through the spaced side portions of the lever. This pin may be fixed by a threaded connection, as at 54, in Fig. 3, and preferably the pin would be tapered and formed at its larger end with a screw driver slot.

Associated with the hand lever 50 is a supporting bracket 55 which has pivotal connection with the hand lever at a distance slightly spaced from the point of connection of the lever with the stem 35. This supporting connection is effected by a horizontal pin 56 that extends through and between the side wall portions of the lever. The pin is contained in a horizontal slot or notch 57 formed in the upper end of the bracket. The bracket has a tubular lower end portion 55x formed with a vertical bore that receives the stem 35 slidably therethrough. This part of the bracket is rotatably contained in the upper end of the nut 20, and fixed thereabout, near its lower end, is an annular collar 62, and this is adapted to be contained within the upper end of the hollow nut 20 and to seat against the adjacent end of the tubular stem 12. The nut 20 thus encloses the base end of this bracket, and by contact with the collar 62, holds the bracket rigidly upright, but permits the bracket to turn with the lever as it is swung from side to side about the axis of the stem 35 in proportioning the water mixture. The extent of this lateral turning of the lever from side to side is limited by reason of a depending stop portion 62x formed on the under side of the collar 62 and contained in an arcuate recess 12x in the upper end surface of the stem 12, as best noted in Fig. 4. The turning adjustment of the piston valve is effected by the lateral turning of the hand lever, and is limited to that necessary for moving the piston in either direction from its neutral position, at which its side channels equally receive hot and cold water, to a position required for closing off either the hot or the cold water ports.

In the details shown in Fig. 1, it is to be observed that a slit 70 extends down from the port 31 in sleeve 10 to allow water under pressure to pass to the under side of the piston valve. Thus the pressure of water normally operates to hold the valve seated. However, as soon as the valve is depressed and thereby opened, the water pressure to the lower end of the valve is cut off.

With the lever mechanism arranged as above described, the piston valve will, upon depressing the hand lever to swing it downwardly about its fulcrum support, be moved to an open position and the amount of flow of water from the faucet will be determined by the extent to which the valve is thus depressed. Then, the valve may be rotatably adjusted in either direction to selectively determine the proportionate amounts of hot and cold water to be discharged.

By adding weight to the rear end of the hand lever, it may be caused to return the valve to its closed position when its outer end is released from the hand pressure, or it may be so counterbalanced as to maintain a set position.

The valve shown in Fig. 2 does not differ from that of Fig. 1 in principle. However, it illustrates a construction from which the sleeve 10 has been eliminated and the piston valve is applied within the cylindrical bore of the valve body 1a. A plug 80 is mounted in the upper end of the body bore, and this mounts the spout head thereon. The nut has lateral passages open to the spout head and to the valve chamber. A nut 81 is threaded onto the upper end of the plug and holds the parts assembled.

Also, in this showing, a stop ring 82 is applied, and is clamped tightly between the nut 81 and plug, and this, as noted in Fig. 5, has a stop shoulder 84 therein. The lever supporting bracket 55x is here applied in the same manner as bracket 55 in Fig. 1, but it has an arcuate lug 88 on one side designed to move within the ring 82 with the turning of the bracket, and by contact of the lug 84 to limit the extent of turning to that required.

The hand lever as shown in Fig. 6 is so connected with the valve stem and arm 55 that an upward pull on the longer end portion of the lever with respect to the point of connection with the stem, will move the stem downwardly. This merely calls for a reversal of the points of connection of the stem and arm from that shown in Fig. 1.

The lever shown in Fig. 7 is designed for foot operation and is counter-balanced so that it will automatically close the valve. The operating portion is somewhat extended so as to better adapt it for foot actuation.

Having thus described my invention, what I claim as new therein and desire to secure by Letters Patent is:

A faucet of the character described including a housing providing a valve chamber, a hollow nut threaded thereinto and mixing valve having a stem extended therefrom coaxially through the nut; a bracket having a mounting collar at one end rotatably contained in the hollow nut and held against longitudinal movement relative to the housing and through which the stem is extended, the outer end portion of said bracket being extended from the nut and offset from the stem, and a handle lever pivotally fixed to the outer end of the stem and having a fulcrumed connection with the outer end of the bracket, said mounting collar of the bracket having an integral circumferentially directed flange confined within the hollow nut and terminating in abrupt shoulders at its ends and a non-rotatable member fixed in the nut and equipped with shoulders to be engaged by the shoulders on the collar to limit the extent of turning of the bracket in opposite directions to limit the turning of the valve stem accordingly.

ALFRED M. MOEN.

REFERENCES CITED

The following references are of record in the file of this patent:

UNITED STATES PATENTS

| Number | Name | Date |
|---|---|---|
| 781,525 | Isaacs | Jan. 31, 1905 |
| 908,717 | Westwater | Jan. 5, 1909 |
| 1,660,158 | Goldsmith | Feb. 21, 1928 |
| 1,664,900 | Rosenbaum | Apr. 3, 1928 |
| 1,730,534 | Rosenbaum | Oct. 8, 1929 |
| 1,882,953 | Saelzler | Oct. 18, 1932 |
| 2,087,223 | Thompson | July 13, 1937 |
| 2,202,216 | Madsen | May 28, 1940 |
| 2,295,445 | Anschicks | Sept. 8, 1942 |
| 2,301,439 | Moen | Nov. 10, 1942 |